US008316728B2

(12) United States Patent
Lawson et al.

(10) Patent No.: US 8,316,728 B2
(45) Date of Patent: Nov. 27, 2012

(54) BREAK AWAY SLIDE MECHANISM WITH ENHANCED POSITIONING ACCURACY

(75) Inventors: David E. Lawson, Webster, NY (US); William E. Stevens, Jr., Byron, NY (US)

(73) Assignee: Quality Vision International, Inc., Rochester, NY (US)

(*) Notice: Subject to any disclaimer, the term of this patent is extended or adjusted under 35 U.S.C. 154(b) by 243 days.

(21) Appl. No.: 12/623,111

(22) Filed: Nov. 20, 2009

(65) Prior Publication Data

US 2011/0120240 A1 May 26, 2011

(51) Int. Cl.
*G01D 21/00* (2006.01)
(52) U.S. Cl. ...................................... 73/866.5
(58) Field of Classification Search ............ 73/866.5
See application file for complete search history.

(56) References Cited

U.S. PATENT DOCUMENTS

| 3,326,037 | A | * | 6/1967 | Stewart ........................ 73/620 |
| 3,947,765 | A | * | 3/1976 | Diehl et al. ............. 324/750.14 |
| 5,796,187 | A |   | 8/1998 | Nagai et al. |
| 6,084,326 | A | * | 7/2000 | Nagai et al. ........................ 310/80 |
| 6,712,907 | B1 | * | 3/2004 | Pratt et al. ..................... 118/719 |

FOREIGN PATENT DOCUMENTS

| JP | 05-023980 A | 2/1993 |
| JP | 5023980 A | 2/1993 |
| JP | 2000-092811 A | 3/2000 |
| JP | 2000092811 A | 3/2000 |
| JP | 2009-165204 A | 7/2009 |
| JP | 2009165204 A | 7/2009 |

OTHER PUBLICATIONS

PCT Notification of Transmittal of the International Search Report and the Written Opinion of the International Searching Authority, or the Declaration dated May 25, 2011 (2 pages).
PCT International Search Report dated May 25, 2011—3 pages (in corresponding International Application No. PCT/US2010/051099).
PCT Written Opinion of the International Searching Authority dated May 25, 2011—3 pages (in corresponding International Application No. PCT/US2010/051099).

* cited by examiner

*Primary Examiner* — Hezron E Williams
*Assistant Examiner* — Nashmiya Fayyaz
(74) *Attorney, Agent, or Firm* — Stephen B. Salai, Esq.; Brian B. Shaw, Esq.; Harter Secrest & Emery LLP

(57) ABSTRACT

An actuator for selectively extending and retracting a probe in a measuring instrument comprises an actuator body, a carriage having a first aperture slidably attached to the body, and a second aperture receiving a probe holder having a probe. The first aperture of the carriage, which surrounds the actuator body, includes a first plurality of magnets disposed around an inner circumference of the aperture. The actuator body includes a lead screw, a round lead screw nut mated with the lead screw, and a second plurality of magnets arranged on a periphery of the lead screw nut, generally aligned with the first plurality of magnets. The magnets are arranged so that the carriage may be displaced with respect to the actuator body a sufficient amount that the magnets do not significantly restrain the further movement of the carriage.

3 Claims, 3 Drawing Sheets

BREAK AWAY SLIDE MECHANISM WITH ENHANCED POSITIONING ACCURACY

CROSS-REFERENCE TO RELATED APPLICATIONS none

STATEMENT REGARDING FEDERALLY SPONSORED RESEARCH OR DEVELOPMENT none

REFERENCE TO A "SEQUENCE LISTING"

none

TECHNICAL FIELD

This invention relates generally to linear actuators and more particularly to a linear actuator having a motorized lead screw or ball screw (as used herein, lead screw is intended to encompass both of these and similar arrangements) driving a positioning element that is magnetically attached to a probe holder and provides improved breakaway functionality and enhanced positioning accuracy at the end of travel.

BACKGROUND OF THE INVENTION

Probes of the type used in measuring instruments are known. A desirable type of probe has a mechanism for retracting the probe when not in use. Known mechanisms include a rail and carriage assembly having a probe mounting block attached to the carriage. The mounting block is carried by the carriage and travels along the rail, often driven by a lead screw which is in turn driven by a motor.

Probes of the type with which this invention is concerned are normally either fully retracted or fully extended in use. Intermediate positions are not normally used.

A known actuator is shown in U.S. Pat. No. 6,084,326. In this known mechanism, a lead screw is driven by a motor. When the lead screw is rotated, a displacement member such as a lead screw nut coupled to the screw moves longitudinally. A plurality of magnets couples the displacement member to a carriage having a like plurality of magnets arranged around its inner circumference, and the carriage moves with the lead screw nut.

Known mechanisms of the type described have been widely used but have a few disadvantages. Because of the magnetic coupling, the slider or carriage and probe may be temporarily displaced in a longitudinal direction with respect to the displacement mechanism and disengaged. A rotational displacement and disengagement have not heretofore been possible, however. Furthermore, while known devices are reasonably accurate at the end of travel, they rely on the accuracy of the lead screw threads, the absence of contaminants, and the like for repeatable positioning at the end of travel.

It is an object of this invention to overcome these and other disadvantages of known actuators.

SUMMARY OF THE INVENTION

Briefly stated, and in accordance with one aspect of the invention, an actuator for selectively extending and retracting a probe in a measuring instrument comprises an actuator body or housing, a carriage having a first aperture slidably attached to the body, and a second aperture receiving a probe holder having a probe. The first aperture of the carriage, which surrounds the actuator body, includes a first plurality of magnets disposed around an inner circumference of the aperture.

The actuator body includes a lead screw disposed within the inner circumference of the actuator body, a round lead screw nut mated with the lead screw, and a second plurality of magnets arranged on a periphery of the lead screw nut, generally aligned with the first plurality of magnets. The first and second plurality of magnets are arranged so that the carriage may be displaced with respect to the actuator body either longitudinally or rotationally a sufficient amount that the first and second pluralities of magnets do not significantly restrain the further movement of the carriage relative to the actuator body. The carriage and a base portion of the actuator body include first and second interengaging kinematic mount members attached to the base of the actuator body and the carriage, respectively, for accurately positioning the carriage with respect to the actuator body when the probe holder is in a fully extended position.

In accordance with another aspect of the invention the first and second pluralities of magnets each consists of three magnets.

In accordance with yet another aspect of the invention. The magnets in the first and second pluralities of magnets are equally spaced, 120° apart, and arranged in a single row.

In accordance with still another aspect of the invention, the end of one of the first and second interengaging kinematic mount members comprises a hemisphere.

BRIEF DESCRIPTION OF THE DRAWING FIGURES

DETAILED DESCRIPTION OF THE INVENTION

Figure 1:
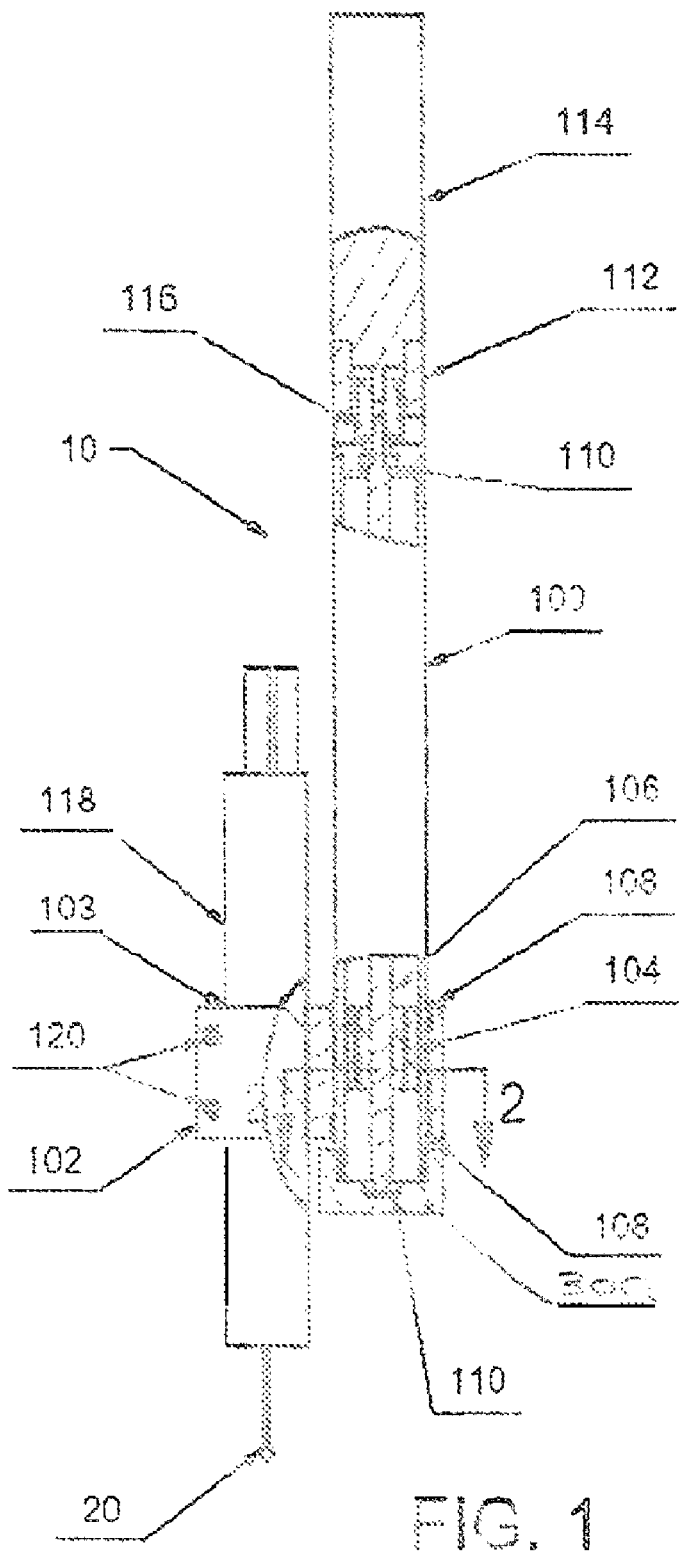
FIG. 1 is a diagrammatic, partly sectioned view of an actuator and probe in accordance with this invention.

Referring now to FIG. 1, an actuator 10, in accordance with one aspect of this invention, for selectively extending and retracting a probe 20 is illustrated in diagrammatic, partly sectioned form. The actuator 10 includes a generally cylindrical actuator body or housing 100, having a motor 114 coupled to the cylindrical body 100 by a motor mount 112. A shaft coupling 116 couples the motor shaft to the shaft of a proportional lead screw 106 mounted between bearings 110 at the top and bottom ends of the housing, respectively. The bearings are preferably ball bearings or other bearings that accurately position the lead screw and support it for rotation by the motor.

The housing 100 is preferably, but not necessarily, cylindrical and also non-ferrous and may be formed from a variety of materials such as plastic, carbon fiber, or the like that provide sufficient rigidity for accurate operation of the actuator.

A movable lead screw nut 104 is carried by the lead screw 106 and has internal threads corresponding to the external lead screw threads. The lead screw shown is round, but may be another shape.

The lead screw nut is constrained from rotation by a plurality of magnets as will be described below and moves up and down the lead screw within the actuator body 100 as the lead screw 106 is rotated by the motor 114. Preferably the lead screw nut 104 has a plurality of magnets 200, preferably three, spaced equally around the outer circumference of the lead screw nut, for example at angular positions 120° apart as shown in more detail in FIG. 2.

The magnets 200 have their north and south poles arranged on a radial line extending through the center of the lead screw nut. The magnets are preferably, but not necessarily, evenly spaced around the circumference of the lead screw nut.

A probe holder 118 is coupled to the actuator body 100 by a carriage 102. The carriage 102 (see also FIG. 2) has two apertures extending there through, a first aperture 206 for slidably and rotationally receiving the actuator body 100 and a second aperture 103 (see FIG. 3) for releasably receiving and holding the probe holder 118. The carriage 102 illustrated in the drawings is rectangular, but other shapes may also be used.

Figure 2:
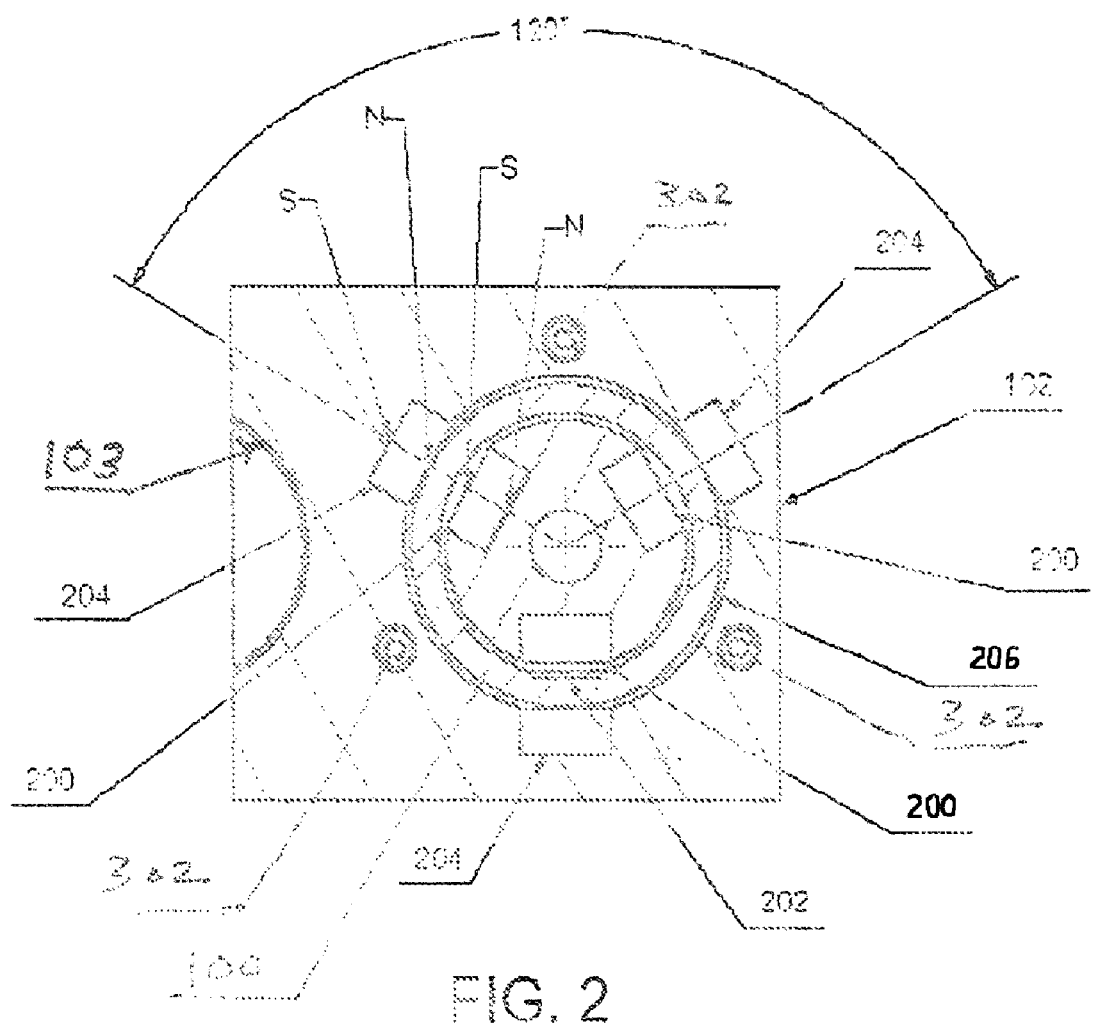
FIG. 2 is a section taken along line 2-2 of FIG. 1.

Preferably, but not necessarily, as shown in FIG. 2, a second like plurality of magnets 204 is arranged around the inner circumference of the aperture 206 of the carriage 102 that surrounds the actuator body 100. The combination of magnets 200 and 204 restrains the lead screw nut 104 from rotating. As shown in FIG. 2, three magnets 204 are arranged around the inner circumference of the aperture 206. The magnets are arranged so that opposite poles of the magnets 200 disposed on the outer periphery of the lead screw nut 104 and the magnets 204 disposed on the inner periphery of the aperture 206 face each other so as to attract. That is, as illustrated in FIG. 2, the south poles of the magnets 200 are adjacent the north poles of the magnets 204.

The selection of the number and size of the magnets in the actuator of this invention permits the probe holder to break away from the lead screw nut in both a longitudinal direction and a radial direction. This may prevent damage of the probe if the force on the probe exceeds a predetermined breakaway force.

The first aperture 206 of the carriage, surrounding the actuator body 100, may also include bearings 108 or the like for slidably and rotationally supporting the carriage with respect to the body 100, or, alternatively, the carriage can simply slide on the actuator body.

Figure 3:
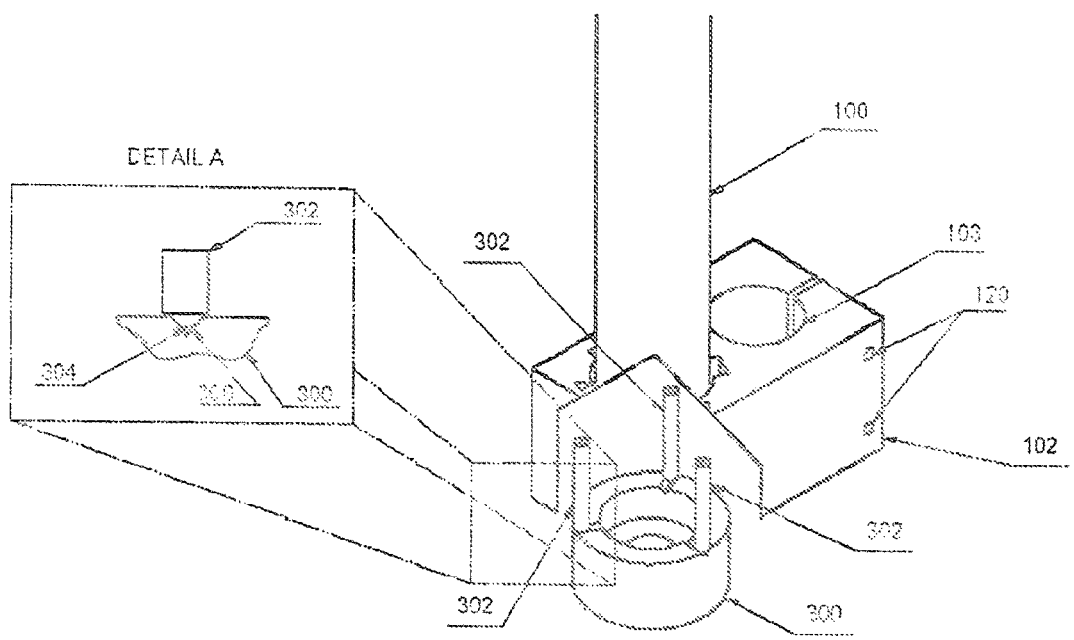
FIG. 3 is a detailed view of the first and second interengaging kinematic mount members

Probe holder 118 is secured to the carriage 102 within a second aperture 103. Screws 120 clamp the probe holder substantially rigidly in the aperture 103 of the carriage 102. Preferably, the aperture 103 frictionally engages the probe holder 118 with a force that may be adjusted by screws 120 or the like as shown in FIGS. 1 and 3. This allows the probe holder 118 to be removed to service the probe as required and also allow for vertical and rotational adjustment of the probe holder 118 with respect to the carriage 102.

FIG. 2 is a section taken along line 2-2 of FIG. 1. The radial positions of the magnets on the carriage 102 and the actuator body 100 may be seen even more clearly in FIG. 2. The aperture 103 receives the probe holder. The tightening screws 120 are not shown in FIG. 2.

Preferably, to maintain the relative orientation of the actuator body 100 and the carriage 102 a ferrous strip 202 which is preferably a steel strip is positioned on the inside surface of the actuator body aligned with one of the pairs of magnets to maintain the relative orientation of the lead screw nut and the carriage 102 and probe holder with respect to the actuator body 100.

As can be seen in FIG. 2, ferrous strip 202 that aligns the carriage and probe holder and the lead screw and provides an advantage over techniques used heretofore in that unwanted rotation is controlled without adding friction between the probe holder and the carriage while at the same time providing a desirable rotational breakaway feature.

FIG. 3 is a detailed view of the first and second interengaging kinematic mount members on the carriage 102 and the base 300 of the actuator body 100, respectively. A hemispherical ball 304 mounted on the end of each of a plurality, preferably 3, of adjuster screws 302 engages a corresponding locating feature such as a slot 305, planar surface, or cone shaped feature on the base 300 of the actuator body 100, which base is preferably but not necessarily ring shaped to precisely locate the probe holder with respect to the actuator body when the actuator is in its fully extended position. While three mount members are shown and are preferred, fewer may be used.

The kinematic mount members engage slightly before the end of travel of the lead screw nut 104 on the lead screw 106, to ensure positive, accurate positioning. The magnetic force between the plurality of magnets 200 and the corresponding magnets 204 created by the slight relative displacement of the magnets holds the balls 304 on the end of the adjuster screws 302 in their respective locating features on the end cap 300.

While the invention has been described in connection with a number of presently preferred embodiments thereof, those skilled in the art will recognize that certain modifications and changes may be made, thereto without departing from the true spirit and scope of the invention, which accordingly, is intended to be defined solely by the appended claims.

The invention claimed is:

1. An actuator for selectively extending and retracting a probe in a measuring instrument comprising:
   an actuator body
   a lead screw disposed within the actuator body;
   a lead screw nut mated with the lead screw;
   a carriage, having a first aperture slidably engaging the actuator body;
   a first and second interengaging kinematic mount members attached to the carriage and the actuator body respectively for accurately positioning the carriage with respect to the actuator body when the carriage is in an extended position, one of the first and second interengaging kinematic mount members comprising a hemispherical bearing;
   a first plurality of magnets disposed around an inner circumference of the first aperture;
   the carriage also including a second aperture engaging a probe holder having a probe attached thereto; and
   a second plurality of magnets arranged on a periphery of the lead screw nut, generally aligned with the first plurality of magnets, the first and second pluralities of magnets arranged so that the carriage may be displaced with respect to the actuator body a sufficient amount that the first and second pluralities of magnets do not significantly restrain the movement of the carriage relative to the actuator body.

2. An actuator for selectively extending and retracting a probe in a measuring instrument comprising:
   an actuator body;
   a lead screw disposed within the actuator body;
   a lead screw nut mated with the lead screw;
   a carriage, having a first aperture slidably engaging the actuator body; a first and second interengaging kinematic mount members attached to the carriage and the actuator body respectively for accurately positioning the carriage with respect to the actuator body when the carriage is in an extended position, one of the first and second interengaging kinematic mount members comprises three hemispherical balls and the other one of the first and second interengaging kinematic mount members comprises three slots;

a first plurality of magnets disposed around an inner circumference of the first aperture;

the carriage also including a second aperture engaging a probe holder having a probe attached thereto; and a second plurality of magnets arranged on a periphery of the lead screw nut, generally aligned with the first plurality of magnets, the first and second pluralities of magnets arranged so that the carriage may be displaced with respect to the actuator body a sufficient amount that the first and second pluralities of magnets do not significantly restrain the movement of the carriage relative to the actuator body.

3. The actuator for selectively extending and retracting a probe of claim 2 in which the first and second interengaging kinematic mount members engage before the lead screw nut reaches a limit of travel on the lead screw whereby the magnets create an axial force urging the members of the kinematic mounts together.

* * * * *